US009600429B2

(12) United States Patent
Pope

(10) Patent No.: US 9,600,429 B2
(45) Date of Patent: Mar. 21, 2017

(54) ENCAPSULATED ACCELERATOR

(71) Applicant: Steven L. Pope, Costa Mesa, CA (US)

(72) Inventor: Steven L. Pope, Costa Mesa, CA (US)

(73) Assignee: SOLARFLARE COMMUNICATIONS, INC., Irvine, CA (US)

(*) Notice: Subject to any disclaimer, the term of this patent is extended or adjusted under 35 U.S.C. 154(b) by 1053 days.

(21) Appl. No.: 13/671,434

(22) Filed: Nov. 7, 2012

(65) Prior Publication Data

US 2013/0080567 A1    Mar. 28, 2013

Related U.S. Application Data

(63) Continuation-in-part of application No. 12/964,642, filed on Dec. 9, 2010, now Pat. No. 8,996,644.
(Continued)

(51) Int. Cl.
*G06F 15/16* (2006.01)
*G06F 13/38* (2006.01)
(Continued)

(52) U.S. Cl.
CPC .......... *G06F 13/385* (2013.01); *G06F 13/102* (2013.01); *G06F 13/28* (2013.01);
(Continued)

(58) Field of Classification Search
CPC ...... G06F 13/102; G06F 13/385; G06F 13/28; G06F 12/1081; G06F 2213/0058; G06F 2213/3808; H04L 49/9068
(Continued)

(56) References Cited

U.S. PATENT DOCUMENTS 4,905,234 A    2/1990   Childress et al.
5,272,599 A   12/1993   Koenen
(Continued)

FOREIGN PATENT DOCUMENTS

EP    620521 A2   10/1994
EP   2463782 A2    6/2012
(Continued)

OTHER PUBLICATIONS

EP 13153148.5—1953—Extended European Search Report dated Feb. 19, 2014, 6 pages.
(Continued)

*Primary Examiner* — Oleg Survillo
(74) *Attorney, Agent, or Firm* — Haynes Beffel & Wolfeld LLP

(57) ABSTRACT

A data processing system comprising: a host computer system supporting a software entity and a receive queue for the software entity; a network interface device having a controller unit configured to provide a data port for receiving data packets from a network and a data bus interface for connection to a host computer system, the network interface device being connected to the host computer system by means of the data bus interface; and an accelerator module arranged between the controller unit and a network and having a first medium access controller for connection to the network and a second medium access controller coupled to the data port of the controller unit, the accelerator module being configured to: on behalf of the software entity, process incoming data packets received from the network in one or more streams associated with a first set of one or more network endpoints; encapsulate data resulting from said processing in network data packets directed to the software entity; and deliver the network data packets to the data port
(Continued)

of the controller unit so as to cause the network data packets to be written to the receive queue of the software entity.

32 Claims, 2 Drawing Sheets

Related U.S. Application Data

(60) Provisional application No. 61/714,405, filed on Oct. 16, 2012.

(51) Int. Cl.
 G06F 13/28 (2006.01)
 H04L 12/861 (2013.01)
 G06F 13/10 (2006.01)

(52) U.S. Cl.
 CPC ........... G06F 2213/0058 (2013.01); G06F 2213/3808 (2013.01); H04L 49/9068 (2013.01)

(58) Field of Classification Search
 USPC ............ 709/213, 223, 230, 250; 711/6, 202; 370/419
 See application file for complete search history.

(56) References Cited

U.S. PATENT DOCUMENTS

| | | | |
|---|---|---|---|
| 5,325,532 A | 6/1994 | Crosswy et al. | |
| 5,612,950 A | 3/1997 | Young | |
| 5,946,189 A | 8/1999 | Koenen et al. | |
| 6,098,112 A | 8/2000 | Ishijima et al. | |
| 6,160,554 A | 12/2000 | Krause | |
| 6,173,333 B1* | 1/2001 | Jolitz ................ H04L 29/06 709/238 | |
| 6,304,945 B1 | 10/2001 | Koenen | |
| 6,349,035 B1 | 2/2002 | Koenen | |
| 6,427,173 B1 | 7/2002 | Boucher et al. | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,591,302 B2 | 7/2003 | Boucher et al. | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,907,042 B1 | 6/2005 | Oguchi | |
| 6,950,961 B2 | 9/2005 | Krause et al. | |
| 6,965,941 B2 | 11/2005 | Boucher et al. | |
| 6,978,331 B1 | 12/2005 | Kagan et al. | |
| 7,089,326 B2 | 8/2006 | Boucher et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,502,870 B1 | 3/2009 | Chu | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,838 B1 | 3/2010 | Aloni et al. | |
| 7,688,853 B2 | 3/2010 | Santiago et al. | |
| 7,702,629 B2 | 4/2010 | Cytron et al. | |
| 7,725,556 B1 | 5/2010 | Schlansker et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,835,380 B1 | 11/2010 | Aloni et al. | |
| 7,848,322 B2 | 12/2010 | Oved | |
| 7,856,488 B2 | 12/2010 | Cripe et al. | |
| 7,864,787 B2 | 1/2011 | Oved | |
| 7,895,445 B1 | 2/2011 | Albanese et al. | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,156,101 B2 | 4/2012 | Indeck et al. | |
| 8,286,193 B2 | 10/2012 | Pope et al. | |
| 8,326,816 B2 | 12/2012 | Colle et al. | |
| 8,332,285 B1 | 12/2012 | Barua et al. | |
| 8,346,919 B1 | 1/2013 | Eiriksson et al. | |
| 2001/0036184 A1 | 11/2001 | Kinoshita et al. | |
| 2002/0059052 A1 | 5/2002 | Bloch et al. | |
| 2002/0095519 A1 | 7/2002 | Philbrick et al. | |
| 2002/0107971 A1* | 8/2002 | Bailey ................ H04L 12/2602 709/231 | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2002/0174240 A1 | 11/2002 | Nason et al. | |
| 2002/0198990 A1 | 12/2002 | Bradfield et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0071250 A1 | 4/2004 | Bunton et al. | |
| 2004/0073716 A1 | 4/2004 | Boom et al. | |
| 2004/0141642 A1 | 7/2004 | Zeng et al. | |
| 2004/0156393 A1 | 8/2004 | Gupta et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210670 A1 | 10/2004 | Anerousis et al. | |
| 2004/0210754 A1 | 10/2004 | Barron et al. | |
| 2004/0240435 A1 | 12/2004 | Boucher et al. | |
| 2004/0249881 A1 | 12/2004 | Jha et al. | |
| 2004/0249998 A1 | 12/2004 | Rajagopalan et al. | |
| 2004/0252685 A1 | 12/2004 | Kagan et al. | |
| 2005/0008223 A1 | 1/2005 | Zeng et al. | |

(56) References Cited

U.S. PATENT DOCUMENTS

| | | |
|---|---|---|
| 2005/0018221 A1 | 1/2005 | Zeng et al. |
| 2005/0021874 A1 | 1/2005 | Georgiou et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0137964 A1 | 6/2005 | Nordlicht et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0187931 A1 | 8/2006 | Hwang |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0121596 A1 | 5/2007 | Kurapati et al. |
| 2007/0188351 A1 | 8/2007 | Brown et al. |
| 2007/0209069 A1 | 9/2007 | Saklikar et al. |
| 2007/0220183 A1 | 9/2007 | Kagan et al. |
| 2007/0223385 A1 | 9/2007 | Berly et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0008205 A1 | 1/2008 | Jung et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140574 A1 | 6/2008 | Boucher et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0189373 A1 | 8/2008 | Ikonen et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0024758 A1 | 1/2009 | Levy-Abegnoli et al. |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0183057 A1 | 7/2009 | Aizman |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0019574 A1 | 1/2011 | Malomsoky et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0151896 A1 | 6/2011 | Goldman et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179315 A1* | 7/2011 | Yang ............ H04L 1/203 714/48 |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0108230 A1 | 5/2012 | Stepanian |
| 2012/0136514 A1 | 5/2012 | Noffsinger et al. |
| 2012/0246052 A1 | 9/2012 | Taylor et al. |
| 2013/0007000 A1 | 1/2013 | Indeck et al. |
| 2015/0049763 A1 | 2/2015 | Michels et al. |

FOREIGN PATENT DOCUMENTS

| | | |
|---|---|---|
| WO | 00/10095 A1 | 2/2000 |
| WO | 0148972 A1 | 7/2001 |
| WO | 0235838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |

OTHER PUBLICATIONS

U.S. Appl. No. 12/964,642—Notice of Allowance dated Nov. 26, 2014, 21 pages.
U.S. Appl. No. 13/624,788—Notice of Allowance dated Dec. 5, 2014, 12 pages.
U.S. Appl. No. 13/283,420—Office Action dated Dec. 3, 2014, 66 pages.
U.S. Appl. No. 13/789,353—Final Office Action dated Jul. 28, 2015, 36 pages.
U.S. Appl. No. 13/283,420—Final Office Action dated Jul. 22, 2015, 12 pages.
U.S. Appl. No. 12/964,642—Office Action dated Feb. 12, 2014, 54 pages.
U.S. Appl. No. 12/964,642—Response to Office Action dated Feb. 12, 2014, filed Jul. 30, 2014, 16 pages.
U.S. Appl. No. 13/789,353—Office Action dated Apr. 23, 2015, 89 pages.
U.S. Appl. No. 13/789,353—Response to Office Action dated Apr. 23, 2015, filed Jul. 13, 2015, 16 pages.
U.S. Appl. No. 13/283,420—Resposne to Office Action dated Dec. 3, 2014, filed Apr. 7, 2015, 13 pages.
U.S. Appl. No. 13/624,788—Office Action dated Aug. 1, 2014, 64 pages
U.S. Appl. No. 13/283,420—Response to Final Office Action dated Jul. 22, 2015, filed Sep. 14, 2015, 16 pages.
U.S. Appl. No. 13/283,420—Notice of Allowance dated Oct. 2, 2015, 17 pages.
EP 13187725.0—1953—Extended European Search Report dated Feb. 19, 2014, (6 pages).
Vinay Aggarwal, et al.; "Workshop on network-I/O convergence: experience, lessons, implications (NICELI)," ACM Computer Communication Review, vol. 33, No. 5, pp. 75-80, Oct. 2003.
Vinton Cerf, Robert Kahn; "A Protocol for Packet Network Intercommunication," IEEE Transactions on Communications, vol. COM-22, No. 5, 13 pages, May 1974.
W. E. Leland, et al.; "On the Self-Similar Nature of Ethernet Traffic," ACM Computer Communication Review, vol. 23, No. 4, pp. 183-193, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.

(56) References Cited

OTHER PUBLICATIONS

W. Feng, et al.; "Performance Characterization of a 10-Gigabit Ethernet TOE," Proceedings of the 13th Symposium on High Performance Interconnects, pp. 1-6, Aug. 17, 2005.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
EP 12185546.4—Extended European Search Report dated Jul. 13, 2013, 6 pages.
E. Ruetsche; "The Architecture of Gb/s Multimedia Protocol Adapter," ACM Computer Communication Review, vol. 23, No. 3, pp. 59-68, Jul. 1993.
Ed Anderson, et al.; "Performance of the CRAY T3E Multiprocessor," Proceedings of the 1997 ACM/IEEE conference on Supercomputing, p. 1-17, San Jose, California; Nov. 16, 1997.
Edward D. Lazowska, David A. Patterson; "Computing Research: A Looming Crisis," ACM Computer Communication Review, vol. 35, No. 2, 2005, pp. 65-68, Jul. 2005.
Eric C. Cooper, et al.; "Protocol Implementation on the Nectar Communication Processor," ACM Computer Communication Review, vol. 20, No. 4, 10 pages, Sep. 1990.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
F.F. Kuo; "The Aloha System," ACM Computer Communication Review, vol. 4, No. 1, pp. 5-8, Jan. 1974.
Gary S. Delp, et al.; "An Analysis of Memnet: An Experiment in High-Speed Shared-Memory Local Networking," ACM Computer Communication Review, vol. 18, No. 4, p. 165-174, 1988; Aug. 1988.
Gene Tsudik; "Message Authentication with One-Way Hash Functions," ACM Computer Communication Review, vol. 22, No. 5, pp. 29-38, 1992; Oct. 1992.
Gordon E. Moore; "Cramming more components onto integrated circuits," Electronics, vol. 38, No. 8, 4 pages, Apr. 1, 1965.
Greg Chesson; "The Evolution of XTP," Proceedings of the Third International Conference on High Speed Networking, pp. 1-10, Nov. 1991.
Greg Minshall, et al.; "Flow labelled IP over ATM: design and rationale ," ACM Computer Communication Review, vol. 36, No. 3, pp. 79-92, 2006; Jul. 2006.
Greg Regnier, et al.; ETA: Experience with an Intel Xeon Processor as a Packet Processing EngineIEEE Micro, vol. 24, No. 1, p. 24-31, 1994; Jan. 1994.
Greg Regnier, et al.; "TCP Onloading for Data Center Servers," Computer, IEEE Computer Society, vol. 37, No. 11, pp. 48-58, 2004; Nov. 2004.
Gregory G. Finn; "An Integration of Network Communication with Workstation Architecture," ACM Computer Communication Review, vol. 21, No. 5, 12 pages, Oct. 1991.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Gregory L. Chesson; "*Declaration of Dr Gregory L Chesson in Alacritech v. Microsoft*," United States District Court, Northern District California, San Francisco Division, 289 pages, Feb. 4, 2005.
H. K. Jerry Chu; "Zero-Copy TCP in Solaris," Proceedings of the USENIX Annual Technical Conference, 13 pages, Jan. 1996.
H. Kanakia and D. Cheriton; "The VMP Network Adapter Board (NAB): High-Performance Network Communication for Multiprocessors," ACM Computer Communication Review, vol. 18, No. 4, p. 175-187, 1988; Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, p. 1-11, San Jose, California; Nov. 16, 1997.

Humaira Kamal, et al.; "SCTP versus TCP for MPI," Proceedings of the 2005 ACM/IEEE conference on Supercomputing, Seattle, Washington, 14 pages, Nov. 12, 2005.
Ian Leslie and Derek R. McAuley; "Fairisle: An ATM Network for the Local Area," ACM Computer Communication Review, vol. 21, No. 4, pp. 327-336, Sep. 1991.
Ian M. Leslie, et al.; "The Architecture of the Universe Network," ACM Computer Communication Review, vol. 14, No. 2, pp. 2-9, 1984; Jun. 1984.
Ian Pratt and Keir Fraser; "Arsenic: A User-Accessible Gigabit Ethernet Interface," Proceedings of IEEE Infocom 2001, pp. 1-11; Apr. 22, 2001.
J. C. Mogul; "The Case for Persistent-Connection HTTP," ACM Computer Communication Review, vol. 25, No. 4, 1995; pp. 299-313, Oct. 1995.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabit Networking Workshop, 10 pages, Apr. 22, 2001.
J. Vis; "A Simple LAN Performance Measure," ACM Computer Communication Review, vol. 24, No. 1, pp. 7-11, 1994; Jan. 1994.
Jack B. Dennis and Earl C. Van Horn; "Programming Semantics for Multiprogrammed Computations," Communications of the ACM, vol. 9, No. 3, pp. 143-155, Mar. 1966.
Jeffrey C. Mogul; "TCP offload is a dumb idea whose time has come," Proceedings of HotOS IX: The 9th Workshop on Hot Topics in Operating Systems, pp. 26-30, May 18, 2003.
Jeffrey R. Michel; "The Design and Evaluation of an Off-Host Communications Protocol Architecture," MSci Thesis, University of Virginia, 144 pages, Aug. 1993.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
John M. McQuillan, et al.; "An Overview of the New Routing Algorithm for the ARPANET," Proceedings of the 6th Data Communications Symposium, pp. 54-60, Nov. 1979.
John Nagle; "Congestion Control in IP/TCP Internetworks," ACM Computer Communication Review, vol. 14, No. 4, p. 11-17, 1984; Oct. 1984.
John Salmon, et al.; "Scaling of Beowulf-class Distributed Systems," Proceedings of the 1998 ACM/IEEE conference on Supercomputing, Orlando, Florida, pp. 1-18, Nov. 7, 1998.
Jon Crowcroft; "10 Networking Papers: Recommended Reading," ACM Computer Communication Review, vol. 36, No. 2, pp. 31-32, Apr. 2006.
Jon Crowcroft, Derek McAuley; "ATM: A Retrospective on Systems Legacy," ACM Computer Communication Review, vol. 32, No. 5, pp. 11-21, Nov. 2002.
Jonathan Kay and Joseph Pasquale; "The Importance of Non-Data Touching Processing Overheads in TCP/IP," ACM Computer Communication Review, vol. 23, No. 4, 10 pages, Oct. 1993.
Jonathan M. Smith and C. Brendan S. Traw; "Giving Applications Access to Gb/s Networking," IEEE Network, vol. 7, Issue 4, 14 pages, Jul. 1993.
Jonathan Smith; "The Influence of ATM on Operating Systems," ACM Computer Communication Review, vol. 32, No. 5, pp. 29-37, 2002; Nov. 2002.
Jonathan Stone, Craig Partridge; "When the CRC and TCP Checksum Disagree," ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.

(56) References Cited

OTHER PUBLICATIONS

K. Kleinpaste, P. Steenkiste, B. Zill; "Software Support for Outboard Buffering and Checksumming," ACM Computer Communication Review, vol. 25, No. 4, p. 87-98, 1995; Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
L. S. Brakmo, et al.; "TCP Vegas: New Techniques for Congestion Detection and Avoidance," ACM Computer Communication Review, vol. 24, No. 4, p. 24-35, 1994; Oct. 1994.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, 1999; Jan. 1999.
M. Kaiserswerth; "The Parallel Protocol Engine," IEEE/ACM Transactions in Networking vol. 1, Issue 6, pp. 650-663, Dec. 1993.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, p. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.
Matthias Kaiserswerth; "The Parallel Protocol Engine," IEEE/ACM Transactions in Networking vol. 1, Issue 6, pp. 650-663, 1993; Dec. 1993.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10 Nov. 7, 1998.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabit-per-Second Local-Area Network," Draft of paper published in IEEE Micro, vol. 15, No. 1, pp. 1-15, Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
O. Angin, et al.; "Report on the 5th IFIP Internation Workshop on Quality of Service (IWQOS 97)," ACM Computer Communication Review, vol. 27, No. 3, pp. 100-117, 1997; Jul. 1997.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
P. Druschel, et al.; "Experiences with a High-Speed Network Adaptor: A Software Perspective," ACM Computer Communication Review, vol. 24, No. 4, pp. 2-13, Oct. 1994.
P. Kermani and L. Kleinrock; "Virtual cut-through: A new computer communciation switching technique," Computer Networks, vol. 3, No. 4, pp. 267-286, Sep. 1979.

Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F•RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffray; "A Critique of RDMA," HPCWire article: http://www.hpcwire.com/features/17886984.html, 7 pages, Aug. 18, 2006.
Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Peter Druschel and Larry L. Peterson; "Fbufs: A High-Bandwidth Cross-Domain Transfer Facility," ACM Operating Systems Review, vol. 27, Issue 5, p. 189-202, 1993; Dec. 1993.
Peter Steenkiste; "Analyzing Communication Latency using the Nectar Communication Processor," ACM Computer Communication Review, vol. 22, No. 4, pp. 199-209, Oct. 1992.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
R. Braden, et al.; "Computing the Internet Checksum," ACM Computer Communication Review, vol. 19, No. 2, p. 86-94, 1989; Apr. 1989.
R. Bush, D. Meyer; "Some Internet Architectural Guidelines and Philosophy," IETF Network Working Group, Request for Comments: 3439, pp. 1-25, Dec. 2002.
R. J. Black, I. Leslie, and D. McAuley; "Experiences of Building an ATM Switch for the Local Area," ACM Computer Communication Review, vol. 24, No. 4, p. 158-167, 1994; Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, p. 8-17, 1994; Jul. 1994.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Srihari Makineni and Ravi Iyer; "Architectural Characterization of TCP/IP Packet Processing on the Pentium M Processor," Proceed-

(56) References Cited

OTHER PUBLICATIONS ings of the 10th International Symposium on High Performance Computer Architecture, 11 pages, Feb. 14, 2004.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Computing and Systems, Boston, MA, 9 pages, May 1994.
Sumitha Bhandarkar, et al.; "LTCP: Improving the Performance of TCP in Highspeed Networks," ACM Computer Communication Review, vol. 36, No. 1, pp. 41-50, 2006; Jan. 2006.
Thomas Sterling, et al.; "Beowolf: A Parallel Workstation for Scientific Computation," Proceedings of the 24th International Conference on Parallel Processing, pp. 1-4, Aug. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
Tom Kelly; "Scalable TCP: Improving Performance in Highspeed Wide Area Networks," ACM Computer Communication Review, vol. 33, No. 2, pp. 83-91, 2003; Apr. 2003.
V. Cerf, et al.; "Proposal for an International End-to-End Protocol," ACM Computer Communication Review, vol. 6 No. 1, pp. 63-89, Jan. 1976.
V. Jacobson; "Congestion Avoidance and Control," ACM Computer Communication Review, vol. 18, No. 4, pp. 157-173, Aug. 1988.
Various forum members; "MPI: A Message-Passing Interface Standard," Message-Passing Interface Forum, University of Tennessee, Knoxville, 236 pages, May 5, 1994.
"NVIDIA Tesla GPUs to Communicate Faster Over Mellanox InfiniBand Networks," press release dated Nov. 25, 2009, Portland OR, 3 pp: <http://gpgpu.org/2009/11/25/nvidia-tesla-mellanox-infiniband>.
"NVIDIA GPUDirect™ Technology—Accelerating GPU-based Systems," Mellanox Tech. Brief, May 2010, 2pp: <http://www.mellanox.com/pdf/whitepapers/TB_GPU_Direct.pdf>.
Pope, S.L. et al., "Enhancing Distributed Systems with Low-Latency Netowrking," Olivetti and Oracle Research Laboratory, Cambridge Univ. May 1998, 12 pp: <http://www.cl.cam.ac.uk/research/dtg/www/publications/public/files/tr.98.7.pdf>.
Hodges, S.J. et al., "Remoting Peripherals using Memory-Mapped Networks," Olivetti and Oracle Research Laboratory, Cambridge Univ., 1998, 3 pp: <http://www.cl.cam.ac.uk/research/dtg/www/publications/public/files/tr.98.6.pdf>.
Derek Chiou, Boon S. Ang, et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.
Bilic Hrvoye, et al.; "Presentation given at HOTI'01," 9th Symposium on High Performance Interconnects, 9 pages, Aug. 22, 2001.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
Geoffray P., "Protocol off-loading vs on-loading in high-performance networks," 14th Symposium on High Performance Interconnects, Aug. 23, 2006, 5pp.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
A. Edwards, et al.; "User-Space Protocols Deliver High Performance to Applications on a Low-Cost Gb/s LAN," ACM Computer Communication Review, vol. 24, No. 4, pp. 14-23, 1994; Oct. 1994.
A. Edwards, S. Muir; "Experiences Implementing a High-Performance TCP in User-Space," ACM Computer Communication Review, vol. 25, No. 4, 1995 pp. 196-205, Oct. 1995.
A. Romanow and S. Floyd; "The Dynamics of TCP Traffic over ATM Networks," ACM Computer Communication Review, vol. 24, No. 4, p. 79-88, 1994; Oct. 1994.
Andrew D. Birrell, et al.; "Grapevine: An Exercise in Distributed Computing," Communications of the ACM, vol. 25, Issue 4, pp. 260-274, 1982; Apr. 1982.
Andy Currid; "TCP Offload to the Rescue," ACM Queue, vol. 2, No. 3, pp. 58-65, May 1, 2004.
B. Leslie, et al.; "User-level device drivers: Achieved performance," J. Comput. Sci. & Technol., vol. 20, pp. 1-17, Sep. 2005.
Babak Falsafi, et al.; "Application-Specific Protocols for User-Level Shared Memory," Proceedings of the 1994 conference on Supercomputing, pp. 380-389, Washington D.C.; Nov. 14, 1994.
Bruce Lowekamp, et al.; "Topology Discovery for Large Ethernet Networks," ACM Computer Communication Review, vol. 31, No. 4, pp. 237-248, Oct. 2001.
Bruce S. Davie; "A Host-Network Interface Architecture for ATM," ACM Computer Communication Review, vol. 21, No. 4, pp. 307-315, Sep. 1991.
C. A. Thekkath, et al.; "Implementing Network Protocols at User Level," ACM Computer Communication Review, vol. 23, No. 4, pp. 64-132, Oct. 1993.
C. Brendan S. Traw, et al.; "A High-Performance Host Interface for ATM Networks," ACM Computer Communication Review, vol. 21, No. 4, p. 317-325, 1991; Sep. 1991.
C. Kline; "Supercomputers on the Internet: A Case Study," ACM Computer Communication Review, vol. 17, No. 5, pp. 27-33, Aug. 1987.
C. Partridge, J. Hughes, J. Stone; "Performance of Checksums and CRCS over Real Data," ACM Computer Communication Review, vol. 25, No. 4, p. 68-76, 1995; Oct. 1995.
C. Traw and J. Smith; "Hardware/Software organization of a high performance ATM host interface," IEEE Journal on Selected Areas in Communications, pp. 1-22, Feb. 1993.
Charles Kalmanek; "A Retrospective View of ATM," ACM Computer Communication Review, vol. 32, No. 5, pp. 13-19, 2002; Nov. 2002.
Charles P. Thacker and Lawrence C. Stewart; "Firefly: a Multiprocessor Workstation," ACM Operating Systems Review, vol. 21, Issue 4, p. 164-172, 1987; Oct. 1997.
Cheng Jin, et al.; "FAST TCP: Motivation, Architecture, Algorithms, Performance," Proceedings of IEEE Infocom 2004, 21 pages, Mar. 7, 2004.
Chi-Chao Chang, et al.; "Low-Latency Communication on the IBM RISC System/6000 SP," Proceedings of the 1996 ACM/IEEE conference on Supercomputing, Pittsburgh, pp. 1-17. Nov. 17, 1996.
Chris Maeda, Brian Bershad; "Protocol Service Decomposition for High-Performance Networking," ACM Operating Systems Review, vol. 27, Issue 5, 12 pages, Dec. 1993.
Christopher A. Kent, Jeffrey C. Mogul; "Fragmentation Considered Harmful," ACM Computer Communication Review, vol. 17, No. 5, pp. 75-87, Oct. 1987.

(56) References Cited

OTHER PUBLICATIONS

Craig Partridge; "How Slow Is One Gigabit Per Second ?," ACM Computer Communication Review, vol. 20, No. 1, p. 44-53, 1990; Jan. 1990.

D. D. Clark and D. L. Tennenhouse; "Architectural Considerations for a New Generation of Protocols," ACM Computer Communication Review, vol. 20, No. 4, pp. 200-208, 1990; Sep. 1990.

D. L. Tennenhouse, D. J. Wetherall; "Towards an Active Network Architecture," ACM Computer Communication Review, vol. 26, No. 2, pp. 5-18, Apr. 1996.

Danny Cohen, et al.; "Use of message-based multicomputer components to construct gigabit networks," ACM Computer Communication Review, vol. 23, No. 4, p. 32-44, Jul. 1993.

Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.

Danny Cohen, Gregory Finn, Robert Felderman, Annette DeSchon; "ATOMIC: A High-Speed Local Communication Architecture," Journal of High Speed Networks; pp. 1-11, Jan. 3, 1994.

David A. Borman; "Implementing TCP/IP on a Cray computer," ACM Computer Communication Review, vol. 19, No. 2, p. 11-15, 1989; Apr. 1989.

David D. Clark; "The Design Philosophy of the DARPA Internet Protocols," ACM Computer Communication Review, vol. 18, No. 4, pp. 102-111, Aug. 1988.

David D. Clark, et al.; "An Analysis of TCP Processing Overhead," IEEE Communications Magazine, vol. 27, No. 6, pp. 23-29, 1989; Jun. 1989.

David R. Boggs, et al.; "Measured Capacity of an Ethernet: Myths and Reality," ACM Computer Communication Review, vol. 18, No. 4, p. 222-234, 1988; Aug. 1988.

David R. Cheriton; "Sirpent: A High-Performance Internetworking Approach," ACM Computer Communication Review, vol. 19, No. 4, p. 158-169, 1989; Sep. 1989.

David Wetherall; "10 Networking Papers: Readings for Protocol Design," ACM Computer Communication Review, vol. 36, No. 3, pp. 77-78, 2006; Jul. 2006.

Derek McAuley, Rolf Neugebauer; "A case for Virtual Channel Processors," Proceedings ot the ACM SIGCOMM 2003 Workshops, pp. 237-242, Aug. 2003.

Derek Robert McAuley; "Protocol Design for High Speed Networks," PhD Thesis, University of Cambridge, 104 pages, Sep. 1989.

E. Blanton and M. Allman; "On Making TCP More Robust to Packet Reordering," ACM Computer Communication Review, vol. 32, No. 1, pp. 20-30, Jan. 2002.

U.S. Appl. No. 13/754,792—Office Action dated Dec. 18, 2015, 92 pages.

U.S. Appl. No. 15/016,659—Notice of Allowance dated May 25, 2016, 20 pages.

U.S. Appl. No. 14/231,510—Office Action dated Mar. 24, 2016, 16 pages.

U.S. Appl. No. 13/624,788—Office Action dated Aug. 1, 2014, 10 pages.

U.S. Appl. No. 13/624,788—Response to Office Action dated Aug. 1, 2014, filed Oct. 29, 2014, 14 pages.

U.S. Appl. No. 13/624,788—Notice of Allowance dated Dec. 5, 2014, 7 pages.

U.S. Appl. No. 13/789,353—Response to Final Office Action dated Jul. 28, 2015, filed Sep. 25, 2015, 13 pages.

U.S. Appl. No. 13/789,353—Advisory Action dated Oct. 16, 2015, 4 pages.

U.S. Appl. No. 13/789,353—Response to Advisory Action and Final Office Action dated Oct. 16, 2015, 14 pages.

* cited by examiner

ENCAPSULATED ACCELERATOR

CROSS REFERENCE TO OTHER APPLICATIONS

This application is a Continuation-In-Part of U.S. application Ser. No. 12/964,642, filed 9 Dec. 2010, incorporated herein by reference. This application also claims the benefit of U.S. Provisional Application No. 61/714,405, filed 16 Oct. 2012, incorporated herein by reference.

BACKGROUND OF THE INVENTION

This invention relates to a network interface device including an accelerator unit and a data processing system comprising such a network interface device.

Achieving the right balance between the functionality/performance of a network interface device and power/cost considerations has long been the subject of debate, particularly in terms of the choice as to which aspects of the communication and other protocols that might operate over the device should be accelerated in hardware at the network interface device. Such acceleration functions are referred to as "offloads" because they offload processing that would otherwise be performed at the CPU of the host system onto the network interface device.

Usually the offload is chosen to be a specific function of the network protocol stack that is amenable to hardware acceleration. Typically, this includes the data integrity aspects of a protocol such as TCP/IP checksums, iSCSI CRC digests, or hashing or lookup operations such as the parsing of data flows onto virtual interface endpoints. Whether or not a particular function of a network protocol is amenable to hardware acceleration depends on several factors, which will now be discussed.

Whether or not a function may be performed based solely on the contents of an individual network packet. This property is termed 'stateless' when applied to an offload. A stateless offload requires little local storage at the network interface—for example, TCP/IP checksum insertion on transmission requires buffering of a single Ethernet frame. In contrast, a statefull operation may require the interface to store state relative to a large number of network flows over a large number of network packets. For example, an Ethernet device that performs reassembly of TCP/IP flows into units which are larger than the MSS (Maximum Segmentation Size) would be required to track many thousands of packet headers. Statefull protocol offloads can therefore require the network interface to have significant amounts of fast memory which is both expensive and power hungry.

Whether or not a function may be directly implemented in parallel logic operating over a single or small number of passes of the data contained within the network packet. This property is termed tractable. For example, the AES GCM cryptographic algorithm has been designed such that the internal feedback loop may be 'unrolled' when implemented. This enables a hardware designer to scale an AES GCM engine's performance (bandwidth) by simply adding more gates in silicon, which by Moore's Law can be readily accommodated as higher speeds are required. In contrast, the Triple-DES cryptographic algorithm may not be unrolled into parallel hardware. This requires an implementation to iterate repeatedly over the data. In order to improve the performance of an iterative algorithm, the implementation must scale in clock frequency, which is becoming increasingly difficult on silicon based processes. Being untractable, iterative algorithms are more difficult to implement as hardware offloads.

Whether or not a protocol function has been designed for hardware execution. Generally, the specification of a hardware protocol will be unambiguous and strictly versioned. For example, Ethernet line encodings are negotiated at link bring up time and, once settled upon, are strictly adhered to. Changing encoding requires a re-negotiation. By contrast, the TCP protocol that has not been specifically designed for execution at hardware is specified by many 10s of RFCs (Request For Comments). These specifications often present alternative behaviours, and are sometimes conflicting, but together define the behaviour of a TCP endpoint. A very basic TCP implementation could be made through adherence to a small number of the RFCs, but such a basic implementation would not be expected to perform well under challenging network conditions. More advanced implementations of the TCP protocol require adherence to a much larger number of the RFCs, some of which specify complex responses or algorithms that are to operate on the same wire protocol and that would be difficult to implement in hardware. Software-oriented specifications are also often in a state of continued development, which is sometimes achieved without strict versioning. As such, software-oriented specifications are usually best expressed in high level programming languages such as C, which cannot be easily parallelized and converted to hardware logic representation.

Whether or not a function is well known and commonly used enough for it to be considered for implementation in a commercial network interface device. Often, application specific functions (such as normalisation of stock exchange data feeds) are only known to practitioners of their field and are not widely used outside of a few companies or institutions. Since the cost of implementing a function in silicon is tremendously expensive, it might not be commercially viable to implement in hardware those functions whose use is limited to a small field.

In summary, features that are typically chosen to be implemented as offloads in hardware are those which are stateless, tractable, hardware oriented, well known and commonly used.

Unfortunately, there are number of functions which do not meet these criteria and yet being performance-sensitive greatly benefit from being accelerated in hardware offloads. For example, in the Financial Services sector it is often the case that large numbers of data feeds must be aggregated together and normalized into a unified data model. This normalisation process would typically unify the feed data into a database by, for example, time representation or stock symbol representation, which would require hundreds of megabytes of data storage to implement in hardware. Other niche application spaces that greatly benefit from being accelerated in hardware offloads include: event monitoring equipment in high energy particle colliders, digital audio/video processing applications, and in-line cryptographic applications.

Often the hardware suitable for accelerating protocol functions in such niche application spaces does not exist because it is simply not commercially viable to develop. In other cases, bespoke network interface hardware has been developed which implement the application specific offloads required but at significant cost, such as with the Netronome Network Flow Engine NFE-3240. Additionally, many bespoke hardware platforms lag significantly behind the performance of commodity silicon. For instance, 40 Gb/s Ethernet NICs are now available and the shift to 100 Gb/s commodity products is quickly approaching, yet most bespoke NICs based upon an FPGA are only capable of 1 Gb/s.

To give an example, the hardware offloads for a normalisation process in the Financial Services sector would typically be implemented at a NIC based upon an FPGA (Field-Programmable Gate Array) controller that includes the features of a regular network interface as well as the custom offloads. This requires the FPGA controller to define, for instance, the Ethernet MACs and PCIe core, as well as the custom offload engines and would typically be provided with a set of bespoke drivers that provide a host system with access to the hardware offloads of the FPGA. This implementation strategy is problematic because the speed and quality of FPGA chips for NICs is not keeping pace with the innovation of commodity NICs that use application specific integrated circuits (ASICs). In fact, the design and implementation of the PCIe core is often the rate determining factor in bringing a custom controller to market and FPGA vendors typically lag the commodity silicon designs by a year.

Furthermore, the problem is becoming more acute as systems become more integrated and demand that NICs offer more commodity features such as receive-side scaling (RSS), support for multiple operating systems, network boot functions, sideband management, and virtualisation acceleration (such as the hardware virtualisation support offered by the PCI-SIG I/O Virtualisation standards). This is being driven by the increasing use of virtualisation in server environments and data centres, and, in particular, the increasing use of highly modular blade servers.

A data processing system 100 is shown in FIG. 1 of the type that might be used in the Financial Services sector to provide hardware accelerated normalisation of certain data feeds. The data processing system 100 includes a bespoke network interface device (NIC) 101 coupled to a host system 102 over communications bus 103. NIC 101 has two physical Ethernet ports 104 and 105 connected to networks 106 and 107, respectively (networks 106 and 107 could be the same network). The bespoke NIC 101 is based around an FPGA controller 108 that provides offloads 109 and 110 in hardware. The offloads could, for example, perform normalisation of data feeds received at one or both of ports 104 and 105. Typically the NIC will also include a large amount of high speed memory 111 in which the data processed by the hardware offloads can be stored for querying by software entities running at host system 102.

Generally, host system 102 will have an operating system that includes a kernel mode driver 112 for the bespoke NIC 101, and a plurality of driver libraries 115 by means of which other software 116 at user level 114 is configured to communicate with the NIC 101. The driver libraries could be in the kernel 113 or at user level 114. In the case of a host system in the Financial Services sector, software 116 might be bank software that includes a set of proprietary trading algorithms that trade on the basis of data generated by the offloads 109 and 110 and stored at memory 111. For example, memory 111 could include a database of normalised stock values, the normalisation having been performed by the offloads 109 and 110 in accordance with known database normalisation methods. Typically, host system 102 will also include management software 117 by means of which the NIC can be managed.

Since NIC 101 provides a customised function set, the vendor of the NIC will provide the driver and driver libraries so as to allow the software 116 to make use of the custom functions of the NIC. Any software running at user level on the host system must therefore trust the vendor and the integrity of the driver and driver libraries it provides. This can be a major risk if the software 116 includes proprietary algorithms or data models that are valuable to the owner of the data processing system. For example, the data processing system could be a server of a bank at which high frequency trading software 116 is running that includes very valuable trading algorithms, the trades being performed at an exchange remotely accessible to the software over network 106 or 107 by means of NIC 101. Since all data transmitted to and from the host system over the NIC traverses the kernel mode vendor driver 112 and vendor libraries 115, the software 116 including its trading algorithms are accessible to malicious or buggy code provided by the NIC vendor. It would be an onerous job for the bank to check all the code provided by the NIC vendor, particularly since the drivers are likely to be regularly updated as bugs are found and updates to the functionality of the NIC are implemented. Furthermore, a NIC vendor may require that a network flow is established between the management software of the NIC 117 to the NIC vendor's own data centres. For example, this can be the case if the NIC is a specialised market data delivery accelerator and the market data is being aggregated from multiple exchanges at the vendor's data centers. With the structure shown in FIG. 1, the bank would not be able to prevent or detect the NIC vendor receiving proprietary information associated with software 116.

Financial institutions and other users of bespoke NICs that need to make use of hardware offloads are therefore currently left with no choice but to operate NICs that offer a level of performance behind that available in a commodity NIC and to trust any privileged code provided by the NIC vendor that is required for operation of the NIC.

There have been efforts to arrange network interface devices to utilise the processing power of a GPGPU (General Purpose GPU) provided at a peripheral card of a data processing system. For example, an Infiniband NIC can be configured to make peer-to-peer transfers with a GPGPU, as announced in the press release found at:

http (colon slash slash) gpgpu (dot) org/2009/11/25/nvidia-tesla-mellanox-infiniband and the Nvidia GPUDirect technology is described at:

http (colon slash slash) www (dot) mellanox (dot) com/pdf/whitepapers/TB_GPIJ_Direct.pdf. Both of these documents are incorporated herein by reference for their teachings.

However, despite offering acceleration for particular kinds of operations (such as floating point calculations), GPGPUs are not adapted for many kinds of operations for which hardware acceleration would be advantageous. For example, a GPGPU would not be efficient at performing the normalisation operations described in the above example. Furthermore, in order for a NIC to make use of a GPGPU, the NIC typically requires an appropriately configured kernel-mode driver and such an arrangement therefore suffers from the security problems identified above.

Other publications that relate to memory-mapped data transfer between peripheral cards include "Remoting Peripherals using Memory-Mapped Networks" by S. J. Hodges et al. of the Olivetti and Oracle Research Laboratory, Cambridge University Engineering Department (a copy of the paper is available at http (colon slash slash) www (dot) cl (dot) cam (dot) ac (dot) uk/research/dtg/www/publicatlons/public/files/tr.9R.6.pdf), and "Enhancing Distributed Systems with Low-Latency Networking", by S. L. Pope et al. of the Olivetti and Oracle Research Laboratory, Cambridge University Engineering Department (a copy of the paper is available at http (colon slash slash) www (dot) cl (dot) cam (dot) ac (dot) uk/research/dtg/www/publications/public/files/tr.98.7.pdt). Both of these documents are incorporated herein by reference for their teachings.

There is therefore a need for an improved network interface device that provides a high performance architecture for custom hardware offloads and an secure arrangement for a data processing system having a network interface device that includes custom hardware offloads.

SUMMARY OF THE INVENTION

According to a first aspect of the present invention there is provided a data processing system comprising: a host computer system supporting a software entity and a receive queue for the software entity; a network interface device having a controller unit configured to provide a data port for receiving data packets from a network and a data bus interface for connection to a host computer system, the network interface device being connected to the host computer system by means of the data bus interface; and an accelerator module arranged between the controller unit and a network and having a first medium access controller for connection to the network and a second medium access controller coupled to the data port of the controller unit, the accelerator module being configured to: on behalf of the software entity, process incoming data packets received from the network in one or more streams associated with a first set of one or more network endpoints; encapsulate data resulting from said processing in network data packets directed to the software entity; and deliver the network data packets to the data port of the controller unit so as to cause the network data packets to be written to the receive queue of the software entity.

Preferably the software entity is configured to programme the first set of one or more network endpoints into the accelerator module.

Suitably said processing of incoming data packets by the accelerator module comprises parsing the incoming data packets so as to identify network messages carried therein that have one or more of a set of characteristics. Preferably the software entity is configured to programme said set of characteristics into the accelerator module.

Suitably the data resulting from the processing of the incoming data packets comprise said identified network messages.

Suitably the software entity is a financial application configured to trade on a remote electronic exchange accessible over the network, the incoming data packets comprise financial messages, and said processing of the incoming data packets by the accelerator module comprises processing the financial messages so as to generate normalised financial data. Suitably the said set of characteristics defines a set of security symbols. Suitably the data resulting from the processing of the incoming data packets comprises said normalised financial data.

Preferably the accelerator module is configured to forward onto the controller unit incoming data packets that are not associated with the first set of one or more network endpoints.

Said processing of incoming data packets by the accelerator module could comprise one or more of: normalisation of financial information carried within financial messages of the incoming data packets; serialisation of trades carried within financial messages of the incoming data packets and directed to an electronic exchange; arbitration between financial message streams; decompression or compression of data packet headers; analysis of scientific data carried within the incoming data packets; processing of digital audio and/or video data carried within the incoming data packets; and in-line cryptographic functions performed on data carried within the incoming data packets.

Preferably the accelerator module is provided at the network interface device. Preferably the controller unit and accelerator module are coupled to one another by means of a SERDES link. Preferably the network interface device further comprises a physical network interface arranged to couple the first medium access controller of the accelerator module to the network, the physical network interface supporting signalling over the network in accordance with a predetermined physical layer protocol.

Preferably the accelerator module further comprises additional interface logic operable to at least partially form memory transactions for performance over the data bus. Preferably the accelerator module is configured to encapsulate said at least partially formed memory transactions in network data packets directed to a network endpoint of the controller unit so as to cause the controller unit to perform the memory transactions over the data bus. Alternatively the at least partially formed memory transactions generated at the additional interface logic are provided to the controller unit over an additional link provided between the accelerator module and the controller unit.

Suitably the additional interface comprises logic sufficient to at least partially form PCIe Transaction Layer Packets.

Preferably the controller unit is further coupled to the accelerator module by a Network Controller Sideband Interface and a software driver of the network interface device at the host computing system is configured to relay out-of-band control messages generated by the software entity to the accelerator module by means of the Network Controller Sideband Interface.

Preferably the accelerator module is addressable as a network endpoint.

Preferably the host computing system includes a software driver configured to manage the accelerator module by means of driver commands encapsulated within network data packets and directed to a network endpoint of the accelerator.

Preferably the host computing system is a virtualised system having a privileged software domain including a first software driver for the controller unit and configured to present a virtual operating platform to first and second guest domains, the software entity being an application supported at the first guest software domain, and the second guest software domain having a driver library for said accelerator module, the software entity and driver library being accessible to one another as network endpoints.

Preferably the privileged software domain does not include a second software driver for the accelerator module.

Preferably the first guest software domain includes a transport library and the application is arranged to access the driver library and accelerator module by means of the transport library.

Preferably the privileged software domain is a hypervisor or virtual machine monitor.

Preferably the accelerator module or network interface device further comprises a memory configured for storing data generated by said processing performed by the accelerator module, and the software entity is configured to access said memory by means of a read request message encapsulated within a network data packet directed to an endpoint of the accelerator module.

Preferably the network interface device is an Ethernet network interface device and the first and second medium access controllers of the accelerator module are Ethernet MACs.

Suitably the accelerator module is located at a network entity distinct from the host computer system and network interface device and coupled to the controller unit by one or more network links. Preferably the software entity is configured to cause the network to direct said one or more streams to the accelerator module in preference to the host computer system.

According to a second aspect of the present invention there is provided a data processing system comprising: a host computer system supporting a software entity and a transmit queue for the software entity; a network interface device having a controller unit configured to provide a data port for transmitting data packets onto a network and a data bus interface for connection to a host computer system, the network interface device being connected to the host computer system by means of the data bus interface; and an accelerator module arranged between the controller unit and a network and having a first medium access controller for connection to the network and a second medium access controller coupled to the data port of the controller unit, the accelerator module being configured to: on behalf of the software entity, process outgoing data packets received from the transmit queue in one or more streams associated with a first set of one or more network endpoints; encapsulate data resulting from said processing in network data packets directed to said first set of one or more network endpoints; and deliver the network data packets onto the network.

Preferably the software entity is configured to programme the first set of one or more network endpoints into the accelerator module.

Suitably said processing of outgoing data packets by the accelerator module comprises parsing the outgoing data packets so as to identify network messages carried therein that have one or more of a set of characteristics. Preferably the software entity is configured to programme said set of characteristics into the accelerator module.

Suitably the data resulting from the processing of the incoming data packets comprise said identified network messages.

Preferably the accelerator module is addressable as a network endpoint.

Preferably the host computing system includes a software driver configured to manage the accelerator module by means of driver commands encapsulated within network data packets and directed to a network endpoint of the accelerator.

According to a third aspect of the present invention there is provided a reconfigurable logic device for processing data packets and comprising first and second medium access controllers each for communicating network data packets, the reconfigurable logic device being programmable with a set of algorithms which, when performed on data packets received by means of the first medium access controller, cause the reconfigurable logic device to process the received data packets, the reconfigurable logic device being configured to encapsulate data resulting from said processing in network data packets for transmission by means of the second medium access controller.

Preferably the reconfigurable logic device is an FPGA.

Preferably the first and second medium access controllers are Ethernet MACs.

According to a fourth aspect of the present invention there is provided a network interface device for use with a reconfigurable logic device as described herein, the network interface device comprising: a controller unit configured to provide a data port for communicating network data packets and a data bus interface for connection to a host computer system; and a socket for a reconfigurable logic device, the socket being coupled to a physical interface for connection to a network and to the data port of the controller unit such that, in use when a reconfigurable logic device is located in the socket, network data packets received over the physical interface pass through the reconfigurable logic device prior to being received at the controller unit and/or network data packets received from the data port of the controller unit pass through the reconfigurable logic device prior to being transmitted over the physical interface.

Preferably the data port of the controller unit is coupled to the socket for a reconfigurable logic device by means of a serial interface device configured to effect the physical communication of data between the accelerator module and the controller unit.

Preferably the physical interface comprises a physical layer transceiver for performing signalling according to the physical layer of a predetermined network protocol.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention provides solutions to the problems identified in the prior art by offering a novel network interface device and data processing system architecture. A network interface device (NIC) configured in accordance with the present invention is not limited to providing an interface to a particular network fabric, having a particular kind of interface to a host system, or to supporting a particular set of network protocols. For example, such a NIC could: be configured for operation with an Ethernet network, IEEE 802.11 network or a FibreChannel network; interface to a host system over a PCIe, PCI-X, or HTX bus; support communications over UDP, TCP/IP, or IPsec. A host system could be any kind of computer system at which a network interface device can be supported, such as a server. A host system comprising a network interface device will be referred to herein as a data processing system. Note that a network interface device configured in accordance with the present invention need not be provided as a device for connection to an expansion slot (e.g. PCIe) or communications port (e.g. eSATA) of a host system and could form part of the host system. For example, the network interface device could be located at the motherboard of a host system. A controller or controller unit of a network interface device refers to any IC or collection of ICs configured to communicate data between a network and a host processing system to which the NIC is connected.

Figure 1:
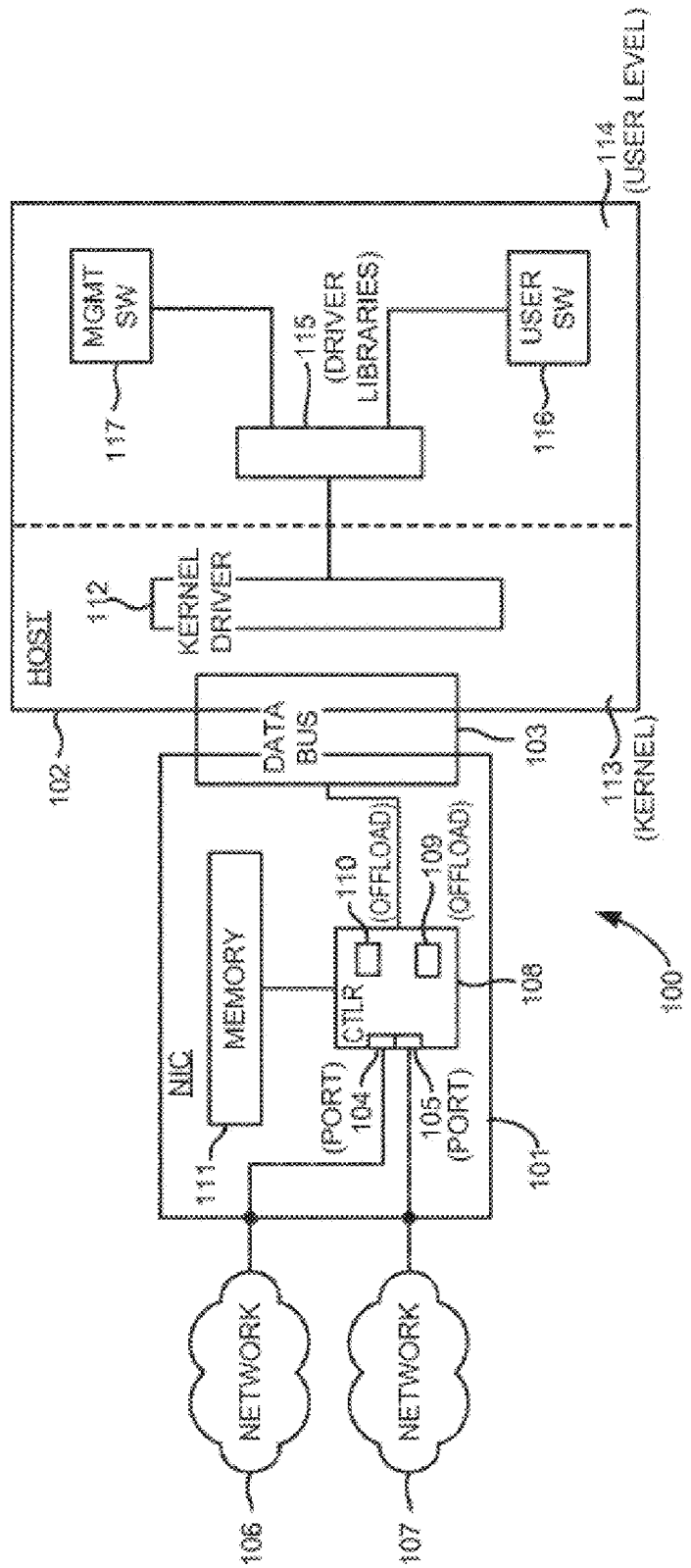
FIG. 1 is a schematic drawing of a data processing system of the prior art comprising a bespoke network interface device that provides one or more offloads defined in hardware.
Figure 2:
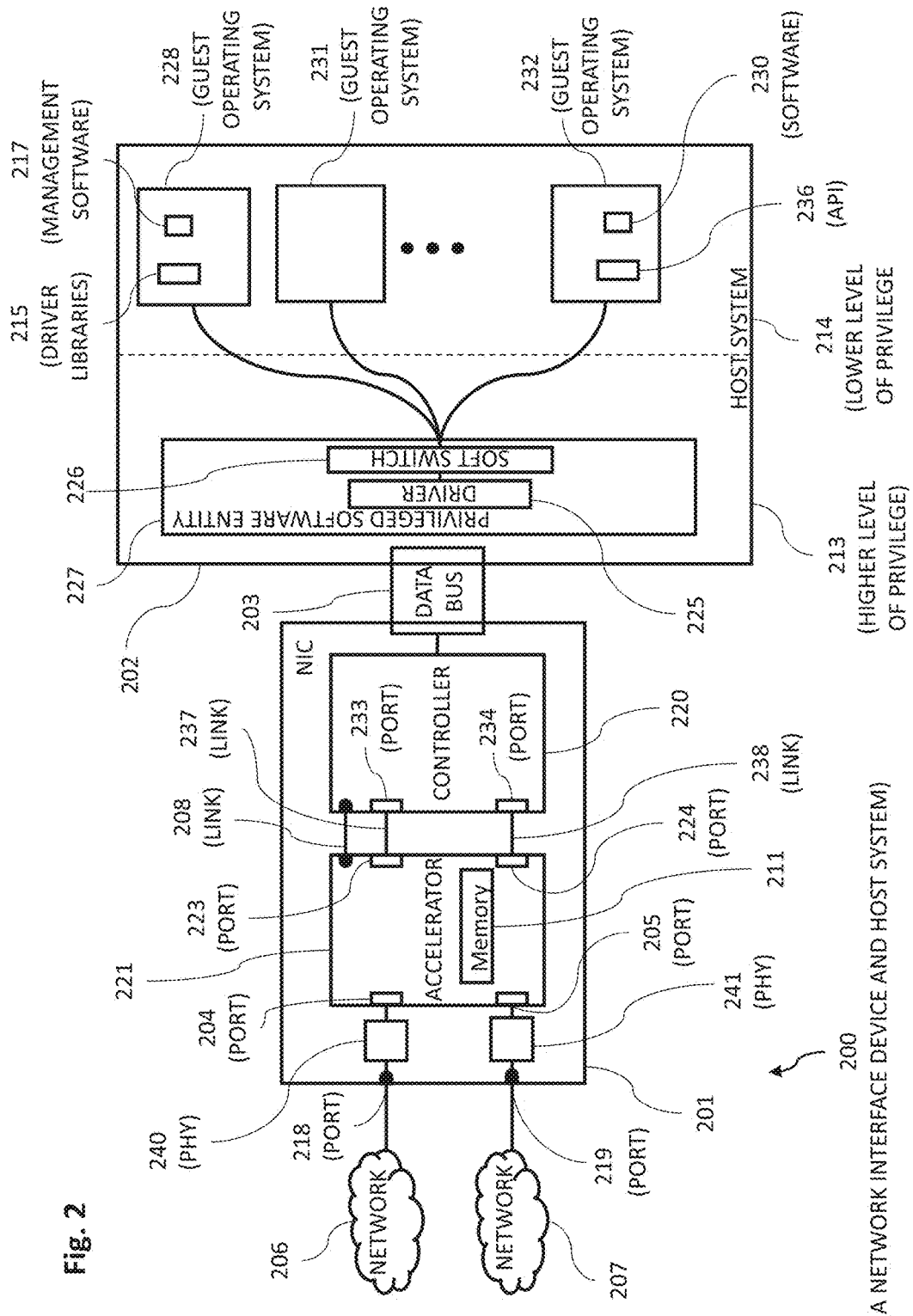
FIG. 2 is a schematic drawing of a data processing system configured in accordance with the present invention, the data processing system comprising a network interface device that provides an accelerator unit.

A network interface device and host system 200 configured in accordance with the present invention is shown in FIG. 2. The NIC 201 presents two ports 218 and 219 for connection to physical networks 206 and 207, but these ports are not directly connected to the ports of the NIC controller 220. A hardware accelerator unit 221 is connected between the controller 220 and the ports 218/219 such that data incoming from and outgoing to the networks 206 and 207 passes through the hardware accelerator. Preferably the accelerator unit 221 is a reconfigurable logic device such as an FPGA, or other programmable integrated circuit. The accelerator unit could include a memory 211 for the storage of data relating to the offloads performed at the accelerator.

In the present example, since the NIC supports two external ports 218, 219 for connection to networks and the controller 220 supports two ports 233 and 234, the accelerator unit 221 provides four ports: 204 and 205 for connection to the external ports of the NIC and 223 and 224 for connection to the ports of the NIC controller. More generally the NIC could support any number of ports, with the accelerator and controller each providing a commensurate number of ports. Each of the ports 204, 205, 223 and 224 includes a Medium Access Controller (MAC), which in the case that 218 and 219 are Ethernet ports would be Ethernet MACs. MACs 204 and 205 of the accelerator unit are provided with PHYs 240 and 241 that implement the physical layer communication protocol in use over the NIC and couple the MACs to the physical medium of networks 206 and 207. The PHYs could be provided at the accelerator 221 but would preferably be provided at one or more separate integrated circuits. MACs 204, 205, 223 and 224 could be implemented at accelerator 221, provided at a separate integrated circuit, or could be part of a multi-chip module (MCM) with the accelerator IC.

The accelerator unit 221 is configured to support any custom hardware offloads required of the NIC so as to allow controller integrated circuit 220 to remain uncustomised. Thus, a standard commodity network interface controller can be used as controller 220, which brings with it all the performance advantages of using commodity silicon. For example, in the case of an Ethernet NIC, controller 220 could be a 40 Gb/s part configured to support two ports each at up to 20 Gb/s. Aside from the raw speed improvements gained by using a commodity ASIC controller, ASIC controllers and their software drivers are generally more highly optimised, and ASICs are cheaper, smaller and consume less power for a given performance level than FPGAs or other programmable ICs. Furthermore, the relatively expensive accelerator unit can be smaller and more straightforward because the accelerator ICs do not need to provide the functions of a regular NIC controller (such as host interfaces, support for parts of a network stack etc.).

Preferably the accelerator unit is a reconfigurable logic device programmable with the algorithms (e.g. code/firmware/processing steps) required for performing the required custom hardware offloads.

By providing the accelerator 221 with MACs so as to allow layer 2, the accelerator (or parts of it) can be logically addressed as a network endpoint. This allows network messages to be communicated to the accelerator by encapsulating those messages in appropriately-formed data packets addressed to logical endpoints held by the accelerator. Hardware accelerator 221 therefore differs from other forms of custom accelerator (for example, a GPGPU) that terminate data flows and that require a NIC configured to support a proprietary interface to the accelerator and/or an interface that requires additional driver layers at the host computer system.

The accelerator is configured to communicate with both network and host entities by means of data packets formed in accordance with the network protocols in use over networks 206 and 207, and links 237 and 238. Thus the accelerator is operable to encapsulate within data packets for delivery to host or network endpoints network messages that are formed at the accelerator or extracted from data streams at the accelerator. New data packet streams could be established between the accelerator and respective host/network endpoint for carrying such newly-formed data packets. In this manner, the accelerator can communicate with host software or other network entities by means of network data packets that are conventionally routable. It is therefore possible to make use of existing network controllers.

The accelerator could include one or more processing engines optimised for performing different types of processing on behalf of host software. For example, an accelerator for processing financial messages could include a parsing engine for parsing data packets of certain incoming or outgoing feeds so as to identify relevant messages or form exchange feeds. Such an accelerator could further include one or more different processing engines that operate in sequence on those identified messages in order to, for example, execute a predetermined trading algorithm and so generate financial network messages defining trades to be performed at a remote financial exchange, or to write data values retrieved from memory 211 to outgoing financial network messages.

The host-facing MACs 223 and 224 of the accelerator and network-facing MACs 233 and 234 of the controller preferably support the same low-level communication protocol (e.g. Ethernet) as the network-facing MACs 204 and 205 so as to avoid the overhead incurred by translating network data packets between protocols at the accelerator. The controller could be configured to provide to the accelerator data packets from the host that are directed to the accelerator through appropriate configuration of the routing table of the NIC.

Accelerator 221 could be configured to perform processing of network messages received from one or both of the host and the network. The accelerator would preferably be configured to identify data packets that comprise network messages for processing by looking for characteristics that indicate that the data packet belongs to a stream that is to be handled at the accelerator. Typically this would be performed by looking at the header of the data packet only. For example, by identifying data packets that are directed to network endpoints associated with the accelerator. This identification could be performed on the basis of source or destination address, data packet type (i.e. the communication protocols the packet complies with), or any number of payload identifiers that indicate a message that is to be processed at the accelerator. Preferably the accelerator would be programmable with such characteristics by host software. Data packets which are not to be handled at the accelerator would by default be passed through to the NIC controller.

One form of processing that could be performed at the accelerator could be the parsing of data packets that have been identified as being for processing at the accelerator in order to identify the network messages contained therein. This would typically be the first step in processing the network messages of a stream of data packets. It might be the case, for example, that only some of the network messages comprised within data packets for the accelerator are required at the host or a remote network endpoint, in which case the accelerator could identify those network messages that are required and encapsulate those network messages for delivery in one or more new streams. In other cases, different network messages of a data packet might be processed in different ways at the accelerator.

Note that the network endpoints associated with the accelerator could in fact be terminated at the host or at a network entity. However, by arranging that the accelerator identify data packets associated with these endpoints, the accelerator can perform processing of the data packets before passing them on to those respective endpoints. This allows, for example, incoming data packets to undergo processing steps in hardware at the accelerator before being passed onto the controller for writing those data packets into the respective host receive queues, and similarly, for outgoing data packets to undergo processing steps in hardware at the accelerator before being transmitted over the network.

The accelerator preferably does however support one or more network endpoints that are at least addressable within the data processing system. This allows software supported at the host computing system to address the accelerator (e.g. so as to configure or query the accelerator) by directing messages to an endpoint of the accelerator. Software supported at the host could communicate with the accelerator by means of standard socket and transport libraries configured to translate messages at the application level into network data packets and vice versa. Similarly, by supporting endpoints addressable over the network, software running on a switch, server, router, or other entity on the network could also communicate with the accelerator via standard network protocols.

In alternative embodiments of the present invention, no identification of data packets to determine whether they are intended for processing at the accelerator is performed. This could be arranged if the port at which those data packets are received is configured to only receive data packets intended for processing at the accelerator (from either the network or host). For example, through appropriate configuration of network 206, port 204 could be provided with only those data feeds that the accelerator is configured to process. The accelerator could then be configured to pass through to the controller all data packets received at port 205, or network 207 could be connected directly into port 234 of the controller such that data packets from that network do not first pass through the accelerator (i.e. not all ports of the controller must be coupled to a network by means of the accelerator, one or more ports could be directly connected to a network). By locating the accelerator between the network and controller, in such cases complex parsing logic would not therefore be required/active at the accelerator or the controller.

In terms of the receive path, hardware accelerator 221 is configured to process data packets arriving in data packet streams from the network for one or more endpoints associated with the accelerator and forward the processed data packets, or data resulting from the processing of the received data packets, onto one or more receive queues at the host computer system. The hardware accelerator passes data onto the NIC controller by encapsulating that data in network data packets. In terms of the transmit path, hardware accelerator 221 is configured to process data packets arriving in data packet streams from the host for one or more endpoints associated with the accelerator and forward the processed data packets, or data resulting from the processing of the outgoing data packets, onto one the network. The hardware accelerator passes data onto the NIC controller by encapsulating that data in network data packets. Thus, the hardware accelerator can process streams of incoming and outgoing data packets on-the-fly.

Alternatively or additionally, the hardware accelerator could process data packets arriving in data packet streams and store the results of that processing in its memory 211 or at the host (e.g. if the accelerator could write directly into host memory by means of the controller). It can be advantageous if the accelerator is in this case configured to allow appropriately formed data packets from the host or network to query the stored data. This provides particularly low latency responses to network entities because the accelerator is connected between the host and the network.

The MACs 233 and 234 of controller 220 are coupled to the host-facing MACs of accelerator 221 such that data packets can be exchanged at low latency over links 237 and 238. This also allows data packets that are received at the accelerator but which are not directed to endpoints at the accelerator to be passed through to the controller with little or no modification (certain stateless processing such as checksum validation could be performed prior to the data packets being received at the controller/accelerator). Since links 237 and 238 would typically be very short, basic physical layer signalling could be used to exchange layer 2 data packets without necessarily employing the typically advanced physical layer signalling used over longer connections. For example, serial interface devices, such as KX4 serial devices, could be used for physical signalling between the accelerator and controller. The use of serial interface devices has the advantages that they are low power and can be implemented using standard SERDES libraries. In order to effect signalling between the accelerator and controller, the accelerator and controller would include (integrally or as a separate or co-located IC) a serial interface device so as to provide a given physical interface between a MAC of the accelerator and the corresponding MAC of the controller.

The routing table of the NIC would preferably be configured to enable the controller to direct data packets between endpoint(s) associated with the accelerator, receive queues of the host computer system and the network endpoints of remote hosts accessible over the network. The controller would generally be better optimised for performing such functions and it is preferable that any switching functions required of the NIC are performed at the controller.

The serial interface devices (or, less preferably, full PHYs according to the network protocol in use at the NIC) could be provided at integrated circuits separate from the respective controller/accelerator, or could be part of a multi-chip module (MCM) with the respective controller/accelerator or even integrated on die NIC controller 220 is configured so as to perform the switching of network data packets between its data ports and data bus 203. The controller is therefore operable to direct data packets to the hardware accelerator that are received from the host and identified as being directed to the hardware accelerator in the same way as it might direct data packets destined for a remote endpoint on network 206 over port 233. This can be achieved in the conventional manner by programming the switch of controller 220 to route data packets to particular data ports in dependence on the network endpoint (i.e. network address) to which each data packet is directed. Preferably, controller 220 is programmed such the particular network endpoint at the host system to which a data packet is directed determines the DMA channel into which it is delivered.

More generally, a NIC configured in accordance with the present invention could have any number of ports, with a corresponding number of ports being provided at the controller and each of the network-facing and host-facing sides of the accelerator. For example, if the NIC provides three network ports, the accelerator would have six ports in total (three network-facing and three host-facing) and the controller would have three ports coupled to the host-facing ports of the accelerator. In alternative embodiments of the present invention, it need not be the case that all network ports of the NIC connect through the accelerator and one or more ports of the NIC could be directly connected into one or more corresponding ports of the controller such that data packets received over those network ports do not traverse the accelerator. This can be advantageous if, for example, data packets received from certain networks are not required at the accelerator.

Note that the accelerator integrated circuits need not be programmable and could be bespoke ASICs. This is unusual because of the high cost of designing and manufacturing an ASIC. However, it will be apparent that many of the advantages of the present invention remain: a network interface controller ASIC 220 is generally more highly optimised than a bespoke controller ASIC that is designed to support one or more hardware offloads, and because many of the complex functions present in a network interface controller need not be designed and manufactured at great expense as part of the custom ASIC. It may be that for some acceleration functions the accelerator ASIC could be based upon other processing architectures such as a GPU or NPU.

By placing the accelerator before the NIC controller, the accelerator is in a position to respond at very low latency to data received from the networks 206/207. For example, accelerator 221 could be configured to support financial trading algorithms configured to automatically place trades at a remote financial exchange in response to data feeds received from that exchange. This can be achieved through suitable programming of the accelerator to cause the accelerator to identify the network messages it is to process and then to process those messages so as to in response form orders according to the trading algorithms. Such a low latency data path could also be useful for other applications for which it would be advantageous to perform processing at the accelerator, such as scientific and database applications, digital audio/video processing applications, and in-line cryptographic applications.

Furthermore, by placing the FPGA before the NIC controller, the FPGA can be configured to provide a "fail-to-wire" mode in which it diverts all incoming data packets back out onto the network in the event that the host becomes unresponsive and stops processing data packets. The accelerator could in this event be configured to update or encapsulate the headers of incoming data packets so as to cause those packets to be directed to another network entity at which those packets could be processed.

It can be advantageous for NIC 201 to be provided in two parts: hardware accelerator 221 and a reference NIC that includes all the parts of the NIC shown in FIG. 2 except for the hardware accelerator; or equally, an accelerator IC 222 and a reference NIC that includes all the parts of the NIC shown in FIG. 2 except for the accelerator IC. By providing at the reference NIC an interface configured to receive a hardware accelerator or accelerator IC, a single reference NIC design can be used with a variety of different hardware accelerators. This allows the custom offloads provided at the NIC to be readily upgraded or modified by simply replacing the hardware accelerator or accelerator IC at the NIC and installing new versions of the driver libraries for the hardware accelerator/accelerator IC at the host system. Such a reference NIC could be configured such that the accelerator forms an optional part of the NIC. This can be achieved through the use of switches or a dummy hardware accelerator part that causes the ports of the NIC (e.g. 218 and 219) to be connected through to the controller unit (e.g. to its MACs 233 and 234).

The controller 220 is configured to interface with host system 202 over data bus 203, which could be, for example, a PCIe data bus. The data bus 203 could alternatively be the backplane of a blade server and could itself operate in accordance with one or more network protocols—for example, the data bus could be a high speed Ethernet backplane.

In the present example, host system 202 is a virtualised system comprising a privileged software entity 227 (such as a hypervisor or virtual machine monitor) that presents a virtual operating platform to a plurality of guest operating systems 228, 231 and 232. The privileged software entity 227 operates at a higher level of privilege 213 (e.g. kernel mode) than the guest operating systems, which operate at a lower level of privilege 214 (e.g. user level mode). However, more generally host system 202 need not be virtualised and could comprise a conventional monolithic software environment with a single operating system supporting a set of applications.

Privileged software entity 227 includes a network interface device driver 225 that is configured to provide a software interface to NIC controller 220. Importantly, because controller 220 is not customised, driver 225 can be a standard driver for the controller whose code has been certified by a trusted party, such as the vendor of the privileged software entity (e.g. through the VMWare IOVP or Microsoft WHQL programs). The driver could also be digitally signed so as to authenticate the origin of the code. For example, if the NIC is an Ethernet NIC and the privileged software entity a Hyper-V Hypervisor of Microsoft Windows Server 2008, then driver 225 could be provided by the NIC vendor and certified by Microsoft for operation in the hypervisor. Since any software installed at the host system must necessarily trust the platform on which it was installed, software executing 230 at guest OS 232 can trust the driver over which it communicates. Furthermore, since driver 225 does not provide any custom functionality and need not be updated when any offload functions implemented at the NIC are modified, it would be possible for the operator of software 230 running at guest domain 232 to check the driver for any malicious or buggy code and trust that the driver is certified and remains unmodified throughout the production life of the machine.

Privileged software entity 227 also includes a soft switch configured to route data packets between the guest operating systems and the network endpoints served by the NIC (i.e. on networks 206 or 207, or at the hardware accelerator), and between network endpoints at the guest operating systems themselves. Network endpoints are, for example, Ethernet or internet protocol (IP) network addresses. Typically, the soft-switch operates only on the standard set of network protocols supported by driver 225.

One of the guest operating systems 228 is configured to include driver libraries 215 for the hardware accelerator. Importantly, driver libraries 215 are configured to communicate with the hardware accelerator 221 by means of data (e.g. commands, responses, state information) encapsulated within network packets directed to an endpoint of the hardware accelerator. Such data packets are routed at soft switch 226 onto data bus 203 for the NIC, and at the switch functions of NIC controller 220 the data packets are routed onwards to port 233 or 234 and hence the hardware accelerator. Similarly, hardware accelerator 221 is configured to communicate with driver libraries 215 by means of data (e.g. commands, responses, state information) encapsulated within regular network packets directed to an endpoint of guest operating system 228 (e.g. a receive queue of the driver libraries 215). In this manner, communications between the driver libraries 215 of the hardware accelerator and the hardware accelerator itself can be achieved using regular network packets that can be handled as such at the switches of the system. The benefits of this are twofold: firstly, it allows the hardware accelerator to be implemented at a high speed port of a commodity NIC as though the hardware accelerator is a network entity addressable over a particular port; and secondly, it allows the driver libraries for the hardware accelerator to be located outside of the kernel at a guest operating system having a low privilege level.

The architecture of the host system is therefore arranged such that none of the code relating to the functions of the hardware accelerator is at a higher privilege level than any sensitive or secret software 230 executing in another guest operating system 232. Software 230 could be, for example, a bank's high frequency trading software comprising a set of highly valuable proprietary trading algorithms. By isolating driver libraries 215 from software 230 in this manner, the owners of software 230 can be confident that any malicious or buggy code provided by the vendor of the hardware accelerator 221 cannot cause the activities of software 230 to be revealed. Accelerator vendor domain 228 could also include any management software 217 for the hardware accelerator.

Accelerator vendor libraries 215 and accelerator management software 217 are arranged to configure the offload functions performed by the hardware accelerator. This can be by, for example, defining the normalisation parameters to be applied to each type of stock, managing the use of a memory 211 by the offloads of the accelerator IC, and defining the characteristics of data packets or messages received at the accelerator that are to be handled at the accelerator and not simply passed through to the controller/network.

Software 230 is configured to communicate with accelerator driver libraries 215 by addressing the driver libraries as a network endpoint. In other words, software 230 transmits network data packets to a network endpoint represented by a receive queue of the driver libraries as though the driver libraries were a remote network entity. Similarly, driver libraries 215 are configured to communicate with software 230 by addressing the software as a network endpoint. The data packets sent between the software and driver libraries encapsulate commands, responses and other data in an analogous way to the system calls and responses exchanged between software and kernel drivers in conventional host systems.

Since data to and from the hardware accelerator can be encapsulated as network data packets, software 230 can communicate with vendor libraries 215 and hardware accelerator 221 by means of a generic application programming interface (API) 236 at the software domain 232. The API maps network send and receive requests by software 230 into the transmission and reception of network data packets. Preferably the protocol in use over connections between software 230 and the hardware accelerator or vendor libraries is a light, low latency protocol such as UDP (User Datagram Protocol). The API could be a POSIX API or other generic API suitable for use at domain 232. No proprietary accelerator vendor code is therefore required at domain 232.

As is well known in the art, some aspects of the formation of data packets in accordance with the network protocol could be performed at the NIC, such as checksum formation. However, it is preferable that connections between software 230 and hardware accelerator 221 or vendor libraries 215 are configured such that checksums are not required in data packets exchanged between those entities. If the path between software and the accelerator is not reliable then a retransmission protocol would preferably be adopted so as to ensure an appropriate level of reliability.

Using a standard network encapsulation and a commodity NIC controller for all messages exchanged with the hardware accelerator has a number of advantages:

By locating the hardware accelerator 221 between the network and the NIC controller, the accelerator can receive data with the lowest possible latency. This is very important for certain applications, such as in high-frequency trading. The present invention provides an architecture in which trading algorithms can be performed as close as possible to the network such that data feeds can be processed and new trades generated at very low latency, without the data having to first traverse the NIC controller.

Since a conventional high-speed NIC controller can be used, data flows can be delivered using receive side scaling (RSS), interrupt moderation and other techniques that improve performance at a host system having a multi-core CPU architecture.

Data flows can be delivered using direct guest access to the guest domains of the virtualised host system, with the hardware virtual switch of controller 220 being configured to select the appropriate DMA delivery channel.

A PCIe controller 220 can be selected that implements the SR-IOV or MR-IOV virtualisation standards that allow multiple DMA channels to be mapped directly into virtual guest address spaces.

These advantages can be achieved through the use of a conventional NIC controller and without requiring that additional functionality is provided at the controller. It can be particularly advantageous to use one or more of techniques 2 to 4 above together at a data processing system.

Note that the advantages described above of a NIC configured in accordance with the present invention do not rely on the NIC being supported at a host system having a virtualised architecture as shown in FIGS. 2 and 3: other host system architectures could be used with NIC 201 in which the offload functions of the hardware accelerator can be accessed as network endpoints. However, a data processing system comprising the combination of NIC 201 and host system 202 of FIGS. 2 and 3 is particularly advantageous since it provides all the performance, cost and flexibility benefits of a NIC as described herein with all the security and stability benefits of a host system having the architecture shown in the figure.

The data processing system and network interface card described herein benefits from the fact that all the 'kernel' mode components of the system can be provided by the commodity vendor and so can be more easily made robust over a large number of operating systems. For example, commodity NIC software is implemented in the mass-market and hence benefits from a commensurate level of engineering and investment. The use of such commodity code reduces the likelihood that the NIC driver would cause instabilities at the data processing system.

The operation of NIC 201 with host system 202 will now be described by way of example. Suppose the data processing system is a high frequency trading server owned by a bank and the hardware accelerator at the NIC provides a set of database normalisation offloads that can be performed on stock data received from an exchange accessible over network 206. Such offloads would be performed by the accelerator IC prior which could then optionally store the results of that offload processing at a database in memory 211 or at the host.

By appropriately configuring the characteristics of exchange messages that are to be processed at the accelerator, the accelerator is directed to identify those messages on which it is to operate. Other messages, or data packets from sources other than the financial exchange(s) of interest would be passed through to the controller 220. In this manner, messages from the desired feeds that arrive at the NIC from the exchange would be normalised by the appropriate hardware offloads defined at the accelerator IC. The accelerator can be configured by means of appropriate instructions from management software 217 in response to requests from the bank's trading software 230 to set up the accelerator so as to process the desired messages from a set of one or more exchange feeds received at the NIC. The hardware accelerator would preferably be associated with the endpoints to which the exchange feeds are directed at the host such that the accelerator receives the data packets of those feeds.

As stock feeds stream in over port 204 and are normalised at the accelerator IC, a normalised database of stock data could be built up at memory 211 or at the host. This is the data that is valuable to the bank's trading algorithms embodied in trading software 230 and that must be accessed in order to allow the software to make trading decisions. Alternatively, the hardware accelerator could support trading algorithms such that, in response to receiving exchange messages relating to, for example, certain security symbols, the accelerator would issue trades in dependence on the values of those security symbols. The algorithms and parameters of the trades would preferably be programmed into the accelerator by the host software managing the accelerator.

Access to the hardware accelerator is mediated by accelerator vendor libraries 215. Thus, if trading software requires access to the hardware accelerator (e.g. to configure a trading strategy or normalisation performed at the accelerator), the vendor libraries 215 are configured to establish connection(s) between one or more endpoints of the hardware accelerator and one or more endpoints of the trading software. Once a connection between the trading software and hardware accelerator has been established (e.g. a connection between an endpoint of the hardware and an endpoint at guest domain 232 has been set up), trading software 230 can read and write to hardware accelerator by means of generic API 236 and the protocol stack.

In this example, data is exchanged between the trading software and hardware accelerator in accordance with the UDP protocol, with the incoming exchange feeds comprising messages according to the a number of exchange specific protocols including FIX, Itch, OPRA [references available if required]. To ensure low latency delivery of data to the trading software, the NIC controller 220 is configured to deliver data packets directed to guest domain 232 over DMA channels established between the NIC and the receive queues of the guest domain. In this manner, the trading software can receive at low latency normalised exchange data or data indicating trades placed by the accelerator. If the NIC/accelerator supports a database comprising data generated by the normalisation offloads of the accelerator IC, the trading software can utilise the low latency network path between host and accelerator in order to allow the proprietary trading algorithms embodied in the software to access the database and make its trading decisions.

Note that the term database is used to refer to an organised cache of data and does not imply any particular general purpose database architecture. Database queries sent by the trading software in network data packets are preferably formatted in accordance with an API defined by the vendor of the hardware accelerator.

Trading algorithms embodied either at the accelerator itself, or at trading software 230 place orders in dependence on the exchange messages received from the network. In this example, port 204 is used to receive stock feed data and port 205 is used to transmit the orders to one or more remote exchanges accessible over network 207.

In a second example, the accelerator could be configured to perform header compression and/or decompression. Network data packets having compressed headers and directed to endpoints associated with the accelerator would have those headers decompressed at the accelerator, with the modified data packets being passed on to their respective endpoints at the host. Similarly, on the transmit path, data packets generated at the host system for transmission over data streams configured to carry data packets having compressed headers could have their headers compressed in hardware at the accelerator. This could be achieved by associating the endpoints to which those data streams are directed with the accelerator so as to cause the accelerator to process those streams, and configuring the accelerator to perform the required layer 3 header compression before passing the modified data packets onto the network. Such an arrangement can be useful for handling packets received over or being for transmission over low-bandwidth wireless links that require compressed layer 3 (e.g. IP)_headers.

In a third example, the accelerator could be configured to perform arbitration between message flows received in streams of data packets. For example, the same financial messages are sometimes provided in two or more streams for redundancy. In such circumstances it can be useful if the accelerator is configured to compare the sequence numbers of network messages received in redundant data streams and deliver only one copy of each message to the respective host receive queue. In some cases, the redundant network messages would be received in data streams having different characteristics: for example, one stream could have compressed layer 3 headers, and another might have uncompressed layer 3 headers in which case the accelerator might have to first perform decompression of the compressed data packet headers. The accelerator could be configured to provide the network messages in a new data packet stream originating at the accelerator, or as a stream of modified data packets.

The hardware accelerator need not be physically located at network interface device 201, and could be provided at another unit of the data processing system with links 237 and 238 being loop-through connections between the accelerator and NIC units such that network traffic first passes through the accelerator and then onto the NIC card. For example, the hardware accelerator could be provided at a PCIe card connected to the NIC by a low latency interconnect, such as a serial link.

In the examples described herein the hardware accelerator is located at network interface device 201. However, since the accelerator can be addressed as a network endpoint, the accelerator could alternatively be provided at a network entity distinct from the host system, such as at a switch or other item of network equipment. It may be necessary to configured the network (e.g. its switch fabric) such that incoming data flows that the accelerator is configured to process are directed in preference to the accelerator (e.g. to the accelerator instead of the host system) and/or that outgoing data flows that the accelerator is configured to process are directed to the accelerator prior to being transmitted from the accelerator to their intended endpoints.

Additional logic could be provided at accelerator 221 to at least partially support the formation of memory transactions over bus 203. This allows the accelerator to address memory at the host and hence permits low latency communication with data structures maintained at the host. This is especially advantageous for data structures that must remain coherent between the accelerator and host software.

The complexity of this additional logic would depend on the level at which the memory transactions are generated at the accelerator. For example, the accelerator could be configured to merely form pseudo memory read/write requests which would be translated into memory transactions for data bus 203 at controller (which includes the logic and physical interfaces necessary to communicate over bus 203). Or the accelerator could include sufficient logic to form requests in accordance with the link layer protocols of data bus 203 and merely rely on the controller to perform physical signalling of the memory transactions onto the data bus. In both cases the physical layer of the data bus would terminate at controller 220. To give a particular example, if data bus 203 is a PCIe bus, accelerator 221 could include sufficient logic to allow it to form PCIe Transaction Layer Packets (TLPs).

The memory transactions would preferably be passed to the controller as messages encapsulated in data packets over link 237/238 (e.g. as memory transaction messages encapsulated within Ethernet packets). By directing such data packets to a predetermined network endpoint supported at the controller, the controller could be caused to perform the memory transactions over data bus 203 on behalf of the accelerator and pass responses to the transactions back to the accelerator also encapsulated in data packets.

Alternatively, such memory transactions could be passed to the controller over an additional link 208 between the accelerator and controller. Such a link can be especially useful for conveying out-of-band control messages to the accelerator from the host (e.g. from host software managing the accelerator). Such an arrangement means that the accelerator does not need to multiplex data and control messages and can use the entire bandwidth of links 237 and 238 for data. Link 208 could for example be an NC-SI bus for low power server management, with control messages being encapsulated for transmission over the NC-SI bus between the accelerator and controller. Control messages would be passed between host and device over data bus 203 (e.g. a PCIe bus) as is conventional for such interfaces. This allows the device driver to relay control messages to the accelerator over an out-of-band path by providing suitable logic NC-SI at the accelerator. It can be further advantageous to provide a memory mapping between user space onto a device driver of the controller so as to allow the user level control software to send messages to the accelerator over the out-of-band path by means of the device driver and controller. This provides the illusion of memory mapped hardware access for user-level control applications.

The network interface device itself need not be provided at a discrete peripheral card of the system and could be located at the mainboard of the system (i.e. as a LOM device). The controller and, in less preferred embodiments, the accelerator could be integrated into a CPU.

The data packets exchanged between the receive queues of the host system and the network endpoints of the hardware accelerator could be, for example, UDP data packets directed to network endpoints identified by IP addresses.

A MAC configured in accordance with the present invention could include multiple protocol layers and is not necessarily restricted to handling only MAC communications protocol. Which protocol layers are supported at a MAC depends on the particular network protocols in use over the data port for which the MAC is provided. For example, if the data ports are Ethernet ports, the MAC would preferably perform only the Ethernet MAC layer, but could also perform the Ethernet LLC layer. With such an arrangement, the network endpoint supported at the MAC of a hardware accelerator would be an Ethernet network address and data communicated with the hardware accelerator would be encapsulated in Ethernet frames at the NIC.

Since the accelerator provides the network-facing MACs it is advantageous if the accelerator is configured to manage bringup and training of the physical connections (e.g. Ethernet) it supports at its network-facing ports. It is also preferable that the accelerator is configured to make available MAC statistics to the host/controller so as to allow the host to receive information relating to packet arrivals/errors etc.

The term network message is used herein to refer to application layer messages that represent process-to-process communications carried over a network within a stream of data packets. Examples of network messages would therefore include FIX messages carrying financial information, and HTTP, IMAP and SSH messages.

A particular advantage of the present invention is that the arrangement of controller and accelerator taught herein allows all the external ports of the controller to be network-facing, which potentially permits NICs to be provided having larger port counts without modification of the controller hardware.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system comprising:
a host computer system supporting a software entity and a receive queue for the software entity;
a network interface device having a controller unit configured to provide a data interface for receiving data packets from a network and a data bus interface that connects to the host computer system, the network interface device being connected to the host computer system by means of the data bus interface; and an accelerator module, addressable as a network endpoint, arranged between the controller unit and the network and having one or more interfaces that connect to the network and a second medium access controller coupled to the data interface of the controller unit, the accelerator module being configured to:

on behalf of the software entity, process incoming data packets received from the network in one or more streams associated with a first set of one or more network endpoints wherein incoming data packets that are not associated with the first set of one or more network endpoints are forwarded onto the controller unit;

encapsulate data resulting from said processing in network data packets directed to the software entity; and deliver the network data packets to the data interface of the controller unit wherein the network data packets are written to the receive queue of the software entity upon delivery.

2. A data processing system as claimed in claim 1, wherein the software entity is configured to programme the first set of one or more network endpoints into the accelerator module.

3. A data processing system as claimed in claim 1, wherein said processing of incoming data packets by the accelerator module comprises parsing the incoming data packets so as to identify network messages carried therein that have one or more of a set of characteristics.

4. A data processing system as claimed in claim 3, wherein the software entity is configured to programme said set of characteristics into the accelerator module.

5. A data processing system as claimed in claim 3, wherein the data resulting from the processing of the incoming data packets comprise said identified network messages.

6. A data processing system as claimed in claim 1, wherein the software entity is a financial application configured to trade on a remote electronic exchange accessible over the network, the incoming data packets comprise financial messages, and said processing of the incoming data packets by the accelerator module comprises processing the financial messages so as to generate normalised financial data.

7. A data processing system as claimed in claim 6, wherein said processing of incoming data packets by the accelerator module comprises parsing the incoming data packets so as to identify network messages carried therein that have one or more of a set of characteristics, and wherein the said set of characteristics defines a set of security symbols.

8. A data processing system as claimed in claim 6, wherein the data resulting from the processing of the incoming data packets comprises said normalised financial data.

9. A network interface device as claimed in claim 1, wherein said processing of incoming data packets by the accelerator module comprises one or more of: normalisation of financial information carried within financial messages of the incoming data packets; serialisation of trades carried within financial messages of the incoming data packets and directed to an electronic exchange; arbitration between financial message streams; decompression or compression of data packet headers; analysis of scientific data carried within the incoming data packets; processing of digital audio and/or video data carried within the incoming data packets; and in-line cryptographic functions performed on data carried within the incoming data packets.

10. A data processing system as claimed in claim 1, wherein the accelerator module is provided at the network interface device.

11. A data processing system as claimed in claim 10, wherein the controller unit and accelerator module are coupled to one another by means of a SERDES link.

12. A data processing system as claimed in claim 10, wherein the network interface device further comprises a physical network interface arranged to couple the one or more interfaces that connect to the network, of the accelerator module, to the network, the physical network interface supporting signalling over the network in accordance with a predetermined physical layer protocol.

13. A data processing system as claimed in claim 10, wherein the accelerator module further comprises additional interface logic operable to at least partially form memory transactions for performance over the data bus.

14. A data processing system as claimed in claim 13, wherein the accelerator module is configured to encapsulate said at least partially formed memory transactions in network data packets directed to a network endpoint of the controller unit so as to cause the controller unit to perform the memory transactions over the data bus.

15. A data processing system as claimed in claim 13, wherein the at least partially formed memory transactions generated at the additional interface logic are provided to the controller unit over an additional link provided between the accelerator module and the controller unit.

16. A data processing system as claimed in claim 13, wherein the additional interface comprises logic sufficient to at least partially form PCIe Transaction Layer Packets.

17. A data processing system as claimed in claim 10, wherein the controller unit is further coupled to the accelerator module by a Network Controller Sideband Interface and a software driver of the network interface device at the host computing system is configured to relay out-of-band control messages generated by the software entity to the accelerator module by means of the Network Controller Sideband Interface.

18. A data processing system as claimed in claim 1, wherein the host computing system includes a software driver configured to manage the accelerator module by means of driver commands encapsulated within network data packets and directed to a network endpoint of the accelerator.

19. A data processing system as claimed in claim 1, wherein the host computing system is a virtualised system having a privileged software domain including a first software driver for the controller unit and configured to present a virtual operating platform to first and second guest domains, the software entity being an application supported at the first guest software domain, and the second guest software domain having a driver library for said accelerator module, the software entity and driver library being accessible to one another as network endpoints.

20. A data processing system as claimed in claim 19, wherein the privileged software domain does not include a second software driver for the accelerator module.

21. A data processing system as claimed in claim 19, wherein the first guest software domain includes a transport library and the application is arranged to access the driver library and accelerator module by means of the transport library.

22. A data processing system as claimed in claim 19, wherein the privileged software domain is a hypervisor or virtual machine monitor.

23. A data processing system as claimed in claim 1, wherein the accelerator module or network interface device further comprises a memory configured for storing data generated by said processing performed by the accelerator module, and the software entity is configured to access said memory by means of a read request message encapsulated within a network data packet directed to an endpoint of the accelerator module.

24. A data processing system as claimed in claim 1, wherein the network interface device is an Ethernet network interface device and the one or more interfaces that connect to the network and one or more interfaces coupled to the data interface of the controller unit, of the accelerator module, are Ethernet MACs.

25. A data processing system as claimed in claim 1, wherein the accelerator module is located at a network entity distinct from the host computer system and network interface device and coupled to the controller unit by one or more network links.

26. A data processing system as claimed in claim 25, wherein the software entity is configured to cause the network to direct said one or more streams to the accelerator module in preference to the host computer system.

27. A data processing system comprising:
a host computer system supporting a software entity and a transmit queue for the software entity;
a network interface device having a controller unit configured to provide a data interface for transmitting data packets onto a network and a data bus interface that connects to the host computer system, the network interface device being connected to the host computer system by means of the data bus interface; and
an accelerator module, addressable as a network endpoint, arranged between the controller unit and the network and having one or more interfaces that connect to the network and one or more interfaces coupled to the data interface of the controller unit, the accelerator module being configured to:

on behalf of the software entity, process outgoing data packets received from the transmit queue in one or more streams associated with a first set of one or more network endpoints, wherein outgoing data packets that are not associated with the first set of one or more network endpoints are forwarded onto the network;

encapsulate data, resulting from said processing, in network data packets directed to said first set of one or more network endpoints; and deliver the network data packets onto the network.

28. A data processing system as claimed in claim 27, wherein the software entity is configured to programme the first set of one or more network endpoints into the accelerator module.

29. A data processing system as claimed in claim 27, wherein said processing of outgoing data packets by the accelerator module comprises parsing the outgoing data packets so as to identify network messages carried therein that have one or more of a set of characteristics.

30. A data processing system as claimed in claim 29, wherein the software entity is configured to programme said set of characteristics into the accelerator module.

31. A data processing system as claimed in claim 29, wherein the data resulting from the processing of the incoming data packets comprise said identified network messages.

32. A data processing system as claimed in claim 27, wherein the host computing system includes a software driver configured to manage the accelerator module by means of driver commands encapsulated within network data packets and directed to a network endpoint of the accelerator.

\* \* \* \* \*

UNITED STATES PATENT AND TRADEMARK OFFICE
CERTIFICATE OF CORRECTION

PATENT NO. : 9,600,429 B2  
APPLICATION NO. : 13/671434  
DATED : March 21, 2017  
INVENTOR(S) : Steven L. Pope Page 1 of 1

It is certified that error appears in the above-identified patent and that said Letters Patent is hereby corrected as shown below:

In the Claims

At Column 21, Claim 1, Line 12, after "endpoints" insert --,--.

Signed and Sealed this  
Second Day of May, 2017

Michelle K. Lee  
*Director of the United States Patent and Trademark Office*